US012683298B2

(12) United States Patent
Afshani Aghajari et al.

(10) Patent No.: US 12,683,298 B2
(45) Date of Patent: Jul. 14, 2026

(54) FULL-DUPLEX TRANSCEIVER

(71) Applicants: Huawei Technologies Canada Co., Ltd., Kanata (CA); La Corporation de l'École Polytechnique de Montréal, Montréal (CA)

(72) Inventors: Amir Afshani Aghajari, Montréal (CA); Ke Wu, Montréal (CA)

(73) Assignees: Huawei Technologies Canada Co., Ltd., Kanata (CA); La Corporation de L'École Polytechnique de Montréal, Montreal (CA)

( * ) Notice: Subject to any disclaimer, the term of this patent is extended or adjusted under 35 U.S.C. 154(b) by 62 days.

(21) Appl. No.: 18/946,103

(22) Filed: Nov. 13, 2024

(65) Prior Publication Data

US 2025/0070485 A1     Feb. 27, 2025

Related U.S. Application Data

(63) Continuation of application No. PCT/CA2022/050797, filed on May 19, 2022.

(51) Int. Cl.
H01Q 25/04          (2006.01)
H04B 1/40           (2015.01)

(52) U.S. Cl.
CPC ............... H01Q 25/04 (2013.01); H04B 1/40 (2013.01)

(58) Field of Classification Search
CPC .................................. H01Q 25/04; H04B 1/40
See application file for complete search history.

(56) References Cited

U.S. PATENT DOCUMENTS

2017/0012364 A1     1/2017   Yang et al.

OTHER PUBLICATIONS

A. Afshani and K. Wu, "Modal Nonreciprocity and Circulator Based on Nonreciprocal Mode Conversion," IEEE Transactions on Microwave Theory and Techniques, vol. 67, No. 12, pp. 4922-4934, Dec. 2019, doi: 10.1109/TMTT.2019.2951566.
A. Afshani and K. Wu, "Concurrent Dual-Mode Circulator," 2019 49th European Microwave Conference (EuMC), 2019, pp. 284-287, doi: 10.23919/EuMC.2019.8910904.

(Continued)

*Primary Examiner* — Graham P Smith
(74) *Attorney, Agent, or Firm* — Tim Tingkang Xia, Esq.; Troutman Pepper Locke LLP

(57)          ABSTRACT

A full-duplex transceiver includes a dual-polarized antenna, a dual-mode waveguide circulator, and at least a receiver port and a transmitter port. The dual-polarized antenna is configured to transmit first electromagnetic waves polarized by the dual-polarized antenna according to a first polarization, and receive second electromagnetic waves polarized according to a second polarization orthogonal to the first polarization. In response to electromagnetic waves being received at the transmitter port, the waveguide circulator guides a TE10 mode of the electromagnetic waves to the antenna for coupling the TE10 mode of the electromagnetic waves to the antenna and polarizing the electromagnetic waves according to the first polarization to form the first electromagnetic waves. In response to the second electromagnetic waves being received at the antenna, the waveguide circulator couples a TE20 mode of the second electromagnetic waves and guides the TE20 mode of the second electromagnetic waves to the receiver port.

20 Claims, 11 Drawing Sheets

(56) References Cited

OTHER PUBLICATIONS

A. Afshani and K. Wu, "Dual-Polarized Patch Antenna Excited Concurrently by a Dual-Mode Substrate Integrated Waveguide," IEEE Transactions on Antennas and Propagation, vol. 70, No. 3, pp. 2322-2327, Mar. 2022, doi: 10.1109/TAP.2021.3118816.

A. Afshani and K. Wu, "Generalized Theory of Concurrent Multimode Reciprocal and/or Nonreciprocal SIW Ferrite Devices," in IEEE Transactions on Microwave Theory and Techniques, vol. 69, No. 10, pp. 4406-4421, Oct. 2021, doi: 10.1109/TMTT.2021.3103990.

A. Afshani and K. Wu, "Nonreciprocal Mode Converting Waveguide and Circulator," in IEEE Transactions on Microwave Theory and Techniques, vol. 67, No. 8, pp. 3350-3360, Aug. 2019, doi: 10.1109/TMTT.2019.2919591.

M. Baraani Dastjerdi, S. Jain, N. Reiskarimian, A. Natarajan, and H. Krishnaswamy, "Analysis and Design of a Full-Duplex Two-Element MIMO Circulator-Receiver With High TX Power Handling Exploiting MIMO RF and Shared-Delay Baseband Self-Interference Cancellation," IEEE Journal of Solid-State Circuits, vol. 54, No. 12, pp. 3525-3540, 2019, doi: 10.1109/jssc.2019.2945303.

Y. Cao and J. Zhou, "Integrated Self-Adaptive and Power-Scalable Wideband Interference Cancellation for Full-Duplex MIMO Wireless," IEEE Journal of Solid-State Circuits, vol. 55, No. 11, pp. 2984-2996, 2020, doi: 10.1109/jssc.2020.3005755.

D. Erricolo, D. S. Filipovic, K. Haneda and Z. Zhang, "Guest Editorial Special Issue on Antennas and Propagation Aspects of In-Band Full-Duplex Applications," in IEEE Transactions on Antennas and Propagation, vol. 69, No. 11, pp. 7085-7091, Nov. 2021, doi: 10.1109/TAP.2021.3118828.

M. Katanbaf, K.-D. Chu, T. Zhang, C. Su, and J. C. Rudell, "Two-Way Traffic Ahead: RFVAnalog Self-Interference Cancellation Techniques and the Challenges for Future Integrated Full-Duplex Transceivers," IEEE Microwave Magazine, vol. 20, No. 2, pp. 22-35, 2019, doi: 10.1109/mmm.2018.2880489.

FULL-DUPLEX TRANSCEIVER

CROSS-REFERENCE TO RELATED APPLICATIONS

This application is a continuation of Patent Cooperation Treaty Application Serial No. PCT/CA2022/050797, filed May 19, 2022, the content of which is incorporated herein by reference in its entirety.

TECHNICAL FIELD

The present disclosure relates to the field of wireless communications and radar systems, and in particular to a full-duplex transceiver.

BACKGROUND

In-band, full-duplex architecture is a promising candidate for 6G and future multifunction wireless systems due to its inherent advantages such as the doubling of data throughput, thereby significantly lowering transmission latency and enabling simultaneous radar and communication applications. In full-duplex operations, the transmission and reception of signals occur at the same time over the same frequency band, presenting a paradigm shift with respect to conventional half-duplex systems.

A well-known challenge in implementing a full-duplex system is the cancellation or reduction of a strong self-interference signal flowing from the transmitter channel into the receiver channel. In order to implement a reliable full-duplex system, the interference signal should be suppressed down to the noise floor. For example, for a Wi-Fi full-duplex transceiver, the suppression should be about 100 dB in both the analog and digital domains. However, to avoid the saturation of analogue-to-digital converters, reduction of the self-interference signal by at least 60 dB should be carried out in the analog domain.

Recently, numerous attempts have been made to propose frontend full-duplex solutions for achieving high isolation (greater than 60 dB) between the transmitter and receiver channels in the analog domain. Although few projects around the globe seem to achieve this goal, their schemes present many problems and disadvantages that are not appealing for practical applications.

Current state-of-the-art solutions aim to exploit radio frequency integrated circuit (RFIC) techniques to achieve high attenuation of the self-interference signal in the analog domain. In particular, active circuits including an attenuator, gain, and phase shifter blocks are used to create a replica of the leakage, manipulate it, and then subtract it from the received signal, thus enhancing the attenuation of the self-interference signal. This technique suffers from inherent problems, including the use of a complex and costly RFIC architecture, significant power consumption due to the use of many active circuits, and non-linear issues.

SUMMARY

According to a first aspect of the disclosure, there is provided a full-duplex transceiver comprising: a dual-polarized antenna, a dual-mode waveguide circulator, and at least a receiver port and a transmitter port, wherein: the dual-polarized antenna is configured to: transmit first electromagnetic waves polarized by the dual-polarized antenna according to a first polarization; and receive second electromagnetic waves polarized according to a second polarization orthogonal to the first polarization; and the dual-mode waveguide circulator is configured to: in response to electromagnetic waves being received at the transmitter port, guide a TE10 mode of the electromagnetic waves to the antenna for coupling the TE10 mode of the electromagnetic waves to the antenna and polarizing the electromagnetic waves according to the first polarization to form the first electromagnetic waves; and in response to the second electromagnetic waves being received at the antenna, couple a TE20 mode of the second electromagnetic waves to the waveguide circulator and guide the TE20 mode of the second electromagnetic waves to the receiver port. The transceiver may achieve full-duplex transmission and reception with relatively high isolation between the transmitter and receiver channels, without the need for potentially costly and complex active circuits.

The waveguide circulator may further comprise a coupler for: coupling, to the antenna, the TE10 mode of the electromagnetic waves received at the transmitter port; and coupling, to the waveguide circulator, the TE20 mode of the second electromagnetic waves received at the antenna; and the coupler comprises at least one first slot oriented perpendicularly to at least one second slot. Therefore, the coupler may simultaneously couple the TE10 and TE20 modes, at the same frequency bandwidth, between the dual-polarized antenna and the dual-mode waveguide circulator.

The transmitter port may be a common mode port configured to couple to the TE10 mode of the electromagnetic waves received at the transmitter port but not couple to the TE20 mode of the second electromagnetic waves received at the antenna. Therefore, leakage between the transmitter port and the TE20 mode of the second electromagnetic waves received at the antenna may be reduced.

The receiver port may be a differential mode port configured to couple to the TE20 mode of the second electromagnetic waves received at the antenna but not couple to the TE10 mode of the electromagnetic waves received at the transmitter port. Therefore, leakage between the receiver port and the TE10 mode of the electromagnetic waves received at the transmitter port may be reduced.

The receiver port and the transmitter port may not be comprised in the waveguide circulator.

The transceiver may further comprise a service port configured to couple to the TE10 mode of the electromagnetic waves received at the transmitter port. Therefore, the service port may sample the transmitted signal. The sampled signal may be needed for other usages, depending on the requirements of the system.

The waveguide circulator may comprise the service port.

The transceiver may further comprise circuitry configured to: receive, from the service port, the TE10 mode of the electromagnetic waves received at the transmitter port; generate, based on the received TE10 mode of the electromagnetic waves, a replica signal; and use the replica signal to reduce interference between the TE10 mode of the electromagnetic waves received at the transmitter port and the TE20 mode of the second electromagnetic waves received at the antenna. Therefore, one or more active circuits may be used to reduce interference between the TE10 mode of the electromagnetic waves received at the transmitter port and the TE20 mode of the second electromagnetic waves received at the antenna.

So as to prevent the TE20 mode of the second electromagnetic waves received at the antenna from coupling to the service port, a width of the waveguide circulator at a first location may be less than a width of the waveguide circulator at a second location, wherein the first location is closer to the service port than the second location. Therefore, leakage between the service port and the TE20 mode of the second electromagnetic waves received at the antenna may be reduced.

The waveguide circulator may comprise a non-reciprocal junction having spaced-apart and opposed sides, and the transceiver may further comprise a bisected stripline connecting the transmitter port to the opposed sides of the non-reciprocal junction. Therefore, the non-reciprocal junction may provide common-mode (TE10 mode) excitation for the waveguide circulator. Simultaneously, the non-reciprocal junction may reduce leakage from the TE20 mode to the transmitter port.

The transceiver may further comprise an intermediate coplanar waveguide transition for transferring the TE10 mode of the electromagnetic waves received at the transmitter port from the bisected stripline to the waveguide circulator. Using striplines may enhance isolation between the transmitter and receiver channels, since striplines may comprise a shielded structure and may be largely immune to undesired and uncontrolled coupling from transmitter ports, transmitter lines, and antenna radiation.

The waveguide circulator may further comprise a non-reciprocal junction having a pair of magnetic components. The transceiver may further comprise circuitry for one or more of: symmetrically tuning the pair of magnetic components so as to tune an operating frequency of the transceiver; and asymmetrically tuning the pair of magnetic components so as to tune an isolation frequency of the transceiver. For example, after tuning the operating frequency of the transceiver using symmetrical biasing, the isolation depth may be tuned by small perturbations to the symmetry of the biasing.

The transceiver may further comprise a stripline connected to the receiver port. The waveguide circulator may further comprise an aperture configured to couple the TE20 mode of the second electromagnetic waves received at the antenna to the stripline connected to the receiver port.

The transceiver may further comprise one or more striplines. Each stripline may comprise one or more interconnected sections. Each section may have a length of $(2n-1)$ $\lambda/4$, wherein n is an integer and $\lambda$ is a wavelength of a transverse electric mode of electromagnetic waves carried by the one or more striplines. Therefore, signal reflection back into the circulator junction may be reduced.

One or more of the first electromagnetic waves and the second electromagnetic waves may have a wavelength of from 56.50 mm to 63.79 mm in air. Therefore, the transceiver may be used for relatively high-frequency radio transmissions and receptions.

The waveguide circulator may be configured such that a degree of isolation between the TE10 mode of the electromagnetic waves received at the transmitter port and the TE20 mode of the second electromagnetic waves received at the antenna, when the TE10 mode and the TE20 mode are guided by the waveguide circulator, is greater than 70 dB over at least a 90 MHz bandwidth.

According to a further aspect of the disclosure, there is provided a method of transmitting and receiving signals using a transceiver, comprising: receiving electromagnetic waves at a transmitter port; in response to the electromagnetic waves being received at the transmitter port, using a dual-mode waveguide circulator to guide a TE10 mode of the electromagnetic waves to a dual-polarized antenna and couple the TE10 mode of the electromagnetic waves to the antenna; in response to the TE10 mode of the electromagnetic waves being coupled to the antenna, transmitting, by the antenna, first electromagnetic waves polarized by the dual-polarized antenna according to a first polarization; receiving, at the antenna, second electromagnetic waves polarized according to a second polarization orthogonal to the first polarization; and in response to the second electromagnetic waves being received at the antenna, using the waveguide circulator to couple a TE20 mode of the second electromagnetic waves and guide the TE20 mode of the second electromagnetic waves to a receiver port.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

Embodiments of the disclosure will now be described in detail in conjunction with the accompanying drawings of which.

DETAILED DESCRIPTION

Figure 1:
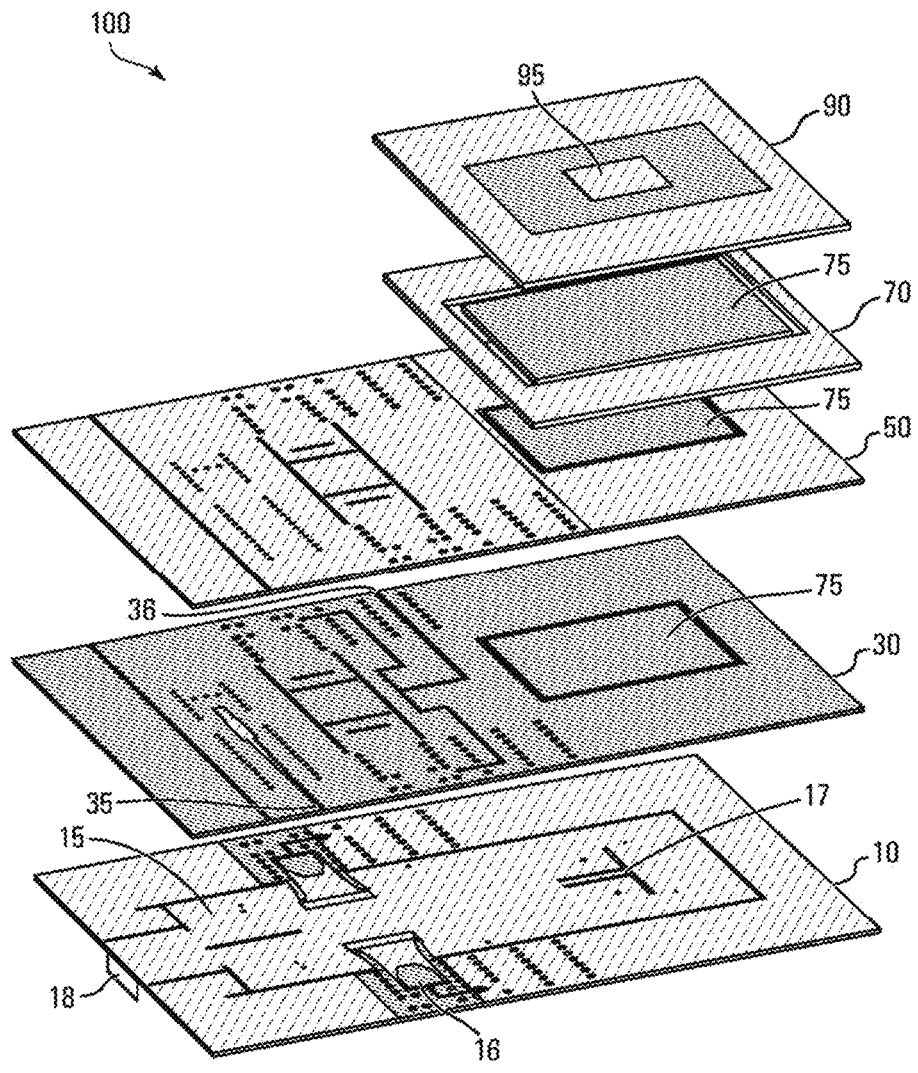
FIG. 1 is a schematic diagram of a multi-layered, full-duplex transceiver, according to an embodiment of the disclosure.

The present disclosure seeks to provide an improved full-duplex transceiver. In particular, the transceiver may achieve full-duplex transmission and reception with relatively high isolation between the transmitter and receiver channels, without the need for potentially costly and complex active circuits. While various embodiments of the disclosure are described below, the disclosure is not limited to these embodiments, and variations of these embodiments may well fall within the scope of the disclosure which is to be limited only by the appended claims.

Generally, embodiments of this disclosure are directed at a full-duplex transceiver comprising a dual-polarized antenna and a dual-mode waveguide circulator. The dual-polarized antenna is configured to transmit electromagnetic waves polarized according to a first polarization (such as a horizontal polarization), and receive electromagnetic waves polarized according to a second polarization (such as a vertical polarization) orthogonal to the first polarization. The dual-mode waveguide circulator is configured to, in response to electromagnetic waves being received at a receiver port of the transceiver, guide a transverse electric 10 mode (a TE10 mode) of the electromagnetic waves to the antenna so as to couple the TE10 mode of the electromagnetic waves to the antenna and thereby cause the electromagnetic waves to be transmitted according to the first polarization. The dual-mode waveguide circulator is further configured to, in response to electromagnetic waves polarized according to the second polarization being received at the antenna, couple a transverse electric 20 mode (a TE20 mode) of the electromagnetic waves and guide the TE20 mode of the electromagnetic waves to a transmitter port of the transceiver.

Generally, according to embodiments of the disclosure, a circulator as described herein may be a non-reciprocal, passive, three-port microwave component. In this context, a waveguide circulator may be a circulator that is implemented in a waveguide.

Embodiments of the transceiver described herein may provide, in the analog domain, more than 70 dB of isolation between the transmitter and receiver channels of the transceiver, over at least 90 MHz of bandwidth. This may enable the transceiver to operate in full-duplex mode, and therefore the transceiver may both simultaneously transmit and receive signals over a common frequency band with an acceptable degree of noise.

Furthermore, transceivers according to embodiments described herein may provide an all-passive solution. In other words, the isolation that is provided between the transmitter and receiver channels may be achieved without the use of active circuits designed to isolate a leakage signal from a received signal, and subtract the leakage signal from the received signal. Having said that, transceivers according to some embodiments described herein may also employ active circuits as described in further detail below, for enhanced reduction of the self-interference signal.

Embodiments of the disclosure may additionally avoid problems associated with current state-of-art schemes such as: 1) low output RF power and low power-handling capability; 2) high direct current (DC) power consumption; 3) complex design and architecture that may not be compatible with current wireless systems and may be difficult to integrate therewith; 4) low linearity; 5) high noise figure; 6) the need for costly RFIC solutions; and 7) the absence of or low frequency tunability.

As described in further detail below, transceivers according to embodiments described herein have been demonstrated by implementing a circuit at 5 GHz for sub 6 GHz applications. The methodology and design described herein may be scaled to other frequency ranges.

As described in further detail below, the dual-polarized antenna and dual-mode waveguide circulator may exploit, within a common, integrated module, both mode and polarization orthogonality in order to achieve relatively high isolation between the transmitter and receiver channels. The dual-mode waveguide circulator may be based on substrate integrated waveguide (SIW) topology in order to enable the high isolation, full-duplex architecture.

Generally, and as described in further detail below, the dual-mode waveguide circulator may comprise a twin-ferrite loaded SIW configuration that provides non-reciprocal circulation of the TE10 and TE20 waveguide modes. According to some embodiments, a coplanar waveguide-to-stripline transition may be used for matching the transmitter port (see below) to the circulator, although other types of transitions may be used, such as a microstrip-slotline-coplanar waveguide transition in the ferrite junction of the circulator. Using a coplanar waveguide-to-stripline transition may allow for lower insertion loss, since a slotline transition may be lossy.

According to some embodiments, a feeding circuit may be used for the excitation of the TE10 mode within the waveguide and the circulator. This feature may enable the circulator to achieve more than 50 dB of isolation between the transmitter and receiver ports.

According to some embodiments, the dual-polarized antenna comprises a two-layer cavity-backed patch antenna that is excited by the dual-mode waveguide circulator. The antenna may be integrated with the dual-mode waveguide circulator within a monolithic module. Integrating the antenna and the waveguide circulator within a common, monolithic module may increase the isolation between the transmitter and receiver channels, by eliminating discontinuities that may exist if two or more separate modules were used.

Embodiments of the disclosure may operate on relatively high RF power, while being low-loss, having relatively high linearity and low noise figure. Furthermore, the design of the transceiver may be relatively simple, low-cost, and compatible with current wireless radio and radar systems.

Turning to FIG. 1, there is shown a full-duplex transceiver 100 according to an embodiment of the disclosure.

Transceiver 100 comprises layers 10, 30, 50, 70, 90 stacked one on top of another (with layer 70 including two separate layers). The dual-mode waveguide circulator (comprising a dual-mode circulator 16 implemented within a waveguide 15) is implemented in copper layer 10. According to some embodiments, layer 10 may have a dielectric of 2.94 and a thickness of 30 mils. As described in further detail below, layer 10 includes a T-shaped slot structure (which may be referred to as "coupler 17") at one end of waveguide 15, etched on top of layer 10. Coupler 17 is configured to excite a dual-polarized patch antenna 95, implemented in layer 90, through a cavity 75 that is formed within layers 30, 50, 70, and 90.

Layers 30 and 50 are used to implement striplines (also known as transmission lines) for a receiver port 35 ("Port 2") and a transmitter port 36 ("Port 3"). Each of layers 30, 50, 70, 90 may have a dielectric constant of 2 and a thickness of 20 mils, 20 mils, 100 mils (including two separate layers at 50 mils each), and 50 mils, respectively. The striplines are etched on top of layer 30, while the underside of layer 30 and the topside of layer 50 serve as the ground plane for the striplines. Metallized via holes, extending through layers 30 and 50, are used to avoid higher-order excitation modes and shield receiver port 35 and a transmitter port 36 from each other. In the embodiment of FIG. 1, the thickness of cavity formed within layers 30, 50, 70, and 90 is 190 mils to thereby allow for a relatively wide bandwidth antenna.

Generally, in the drawings, the portions with more closely-spaced diagonal hatching represent a dielectric, while the portions with less closely-spaced diagonal hatching represent a copper coating.

Receiver port 35 and transmitter port 36 are used to excite the TE20 and TE10 modes, respectively, within waveguide 15. Since the TE20 and TE10 modes are inherently orthogonal, the isolation between receiver port 35 and transmitter port 36 is considerable. Furthermore, additional isolation between receiver port 35 and transmitter port 36 may be provided by the inherent non-reciprocity of circulator 16.

As can be seen in FIG. 1, layer 10 further includes an additional port, service port 18 ("Port 1"), that may or may not be used (as explained in further detail below). If service port 18 is not being used, then service port 18 may be connected to a 50-Ohm load, for example. Due to the non-reciprocity of circulator 16, receiver 36 is isolated from service port 18. However, service port 18 and transmitter port 36 are configured to excite the same mode in waveguide 15, namely the TE10 mode. Therefore, any signal at service port 18 will generally track the transmission signal at transmitter port 36 with a certain isolation factor. According to some embodiments, one or more active circuits may be used, based on the signal received at service port 18, to determine the isolation factor and adjust the received signal based on the isolation factor. As a result, service port 18 may eliminate the need for a coupler as used in conventional active RFIC techniques used to sample the transmission signal.

Transmission

Figure 2:
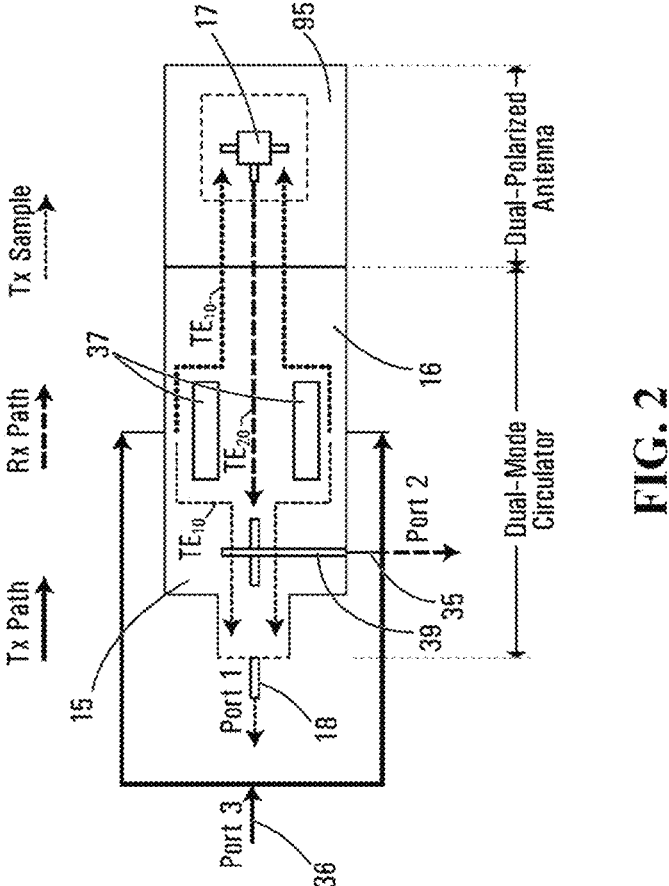
FIG. 2 is a schematic diagram of paths taken by transmitter (Tx) and receiver (Rx) signals within the full-duplex transceiver of FIG. 1.
Figure 3:
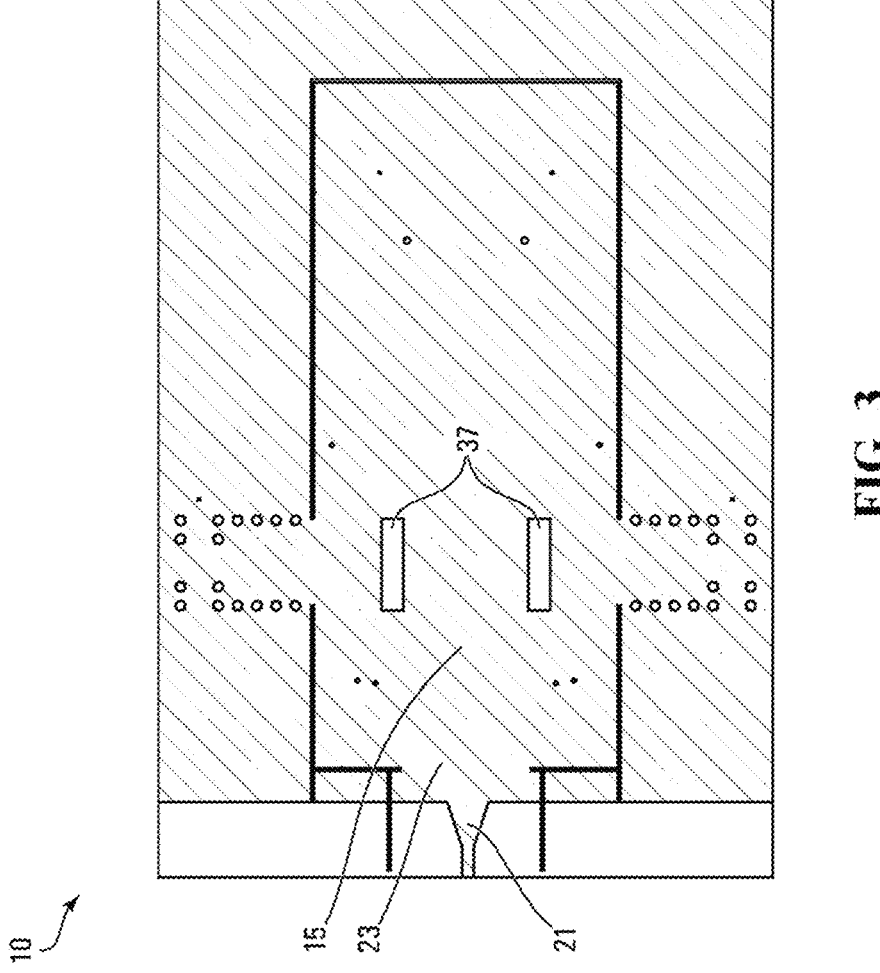
FIG. 3 is a schematic diagram of an underside of a layer implementing a waveguide circulator, according to an embodiment of the disclosure.
Figure 4:
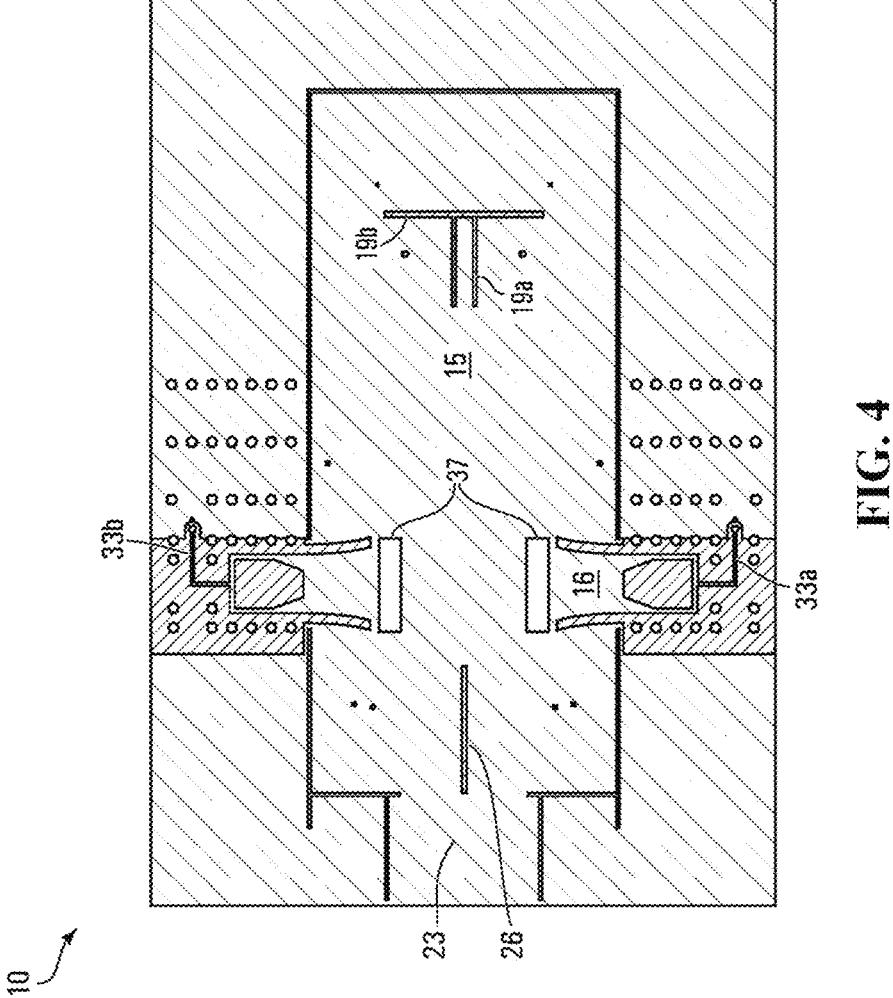
FIG. 4 is a schematic diagram of a top side of the layer implementing the waveguide circulator of FIG. 3.
Figure 5:
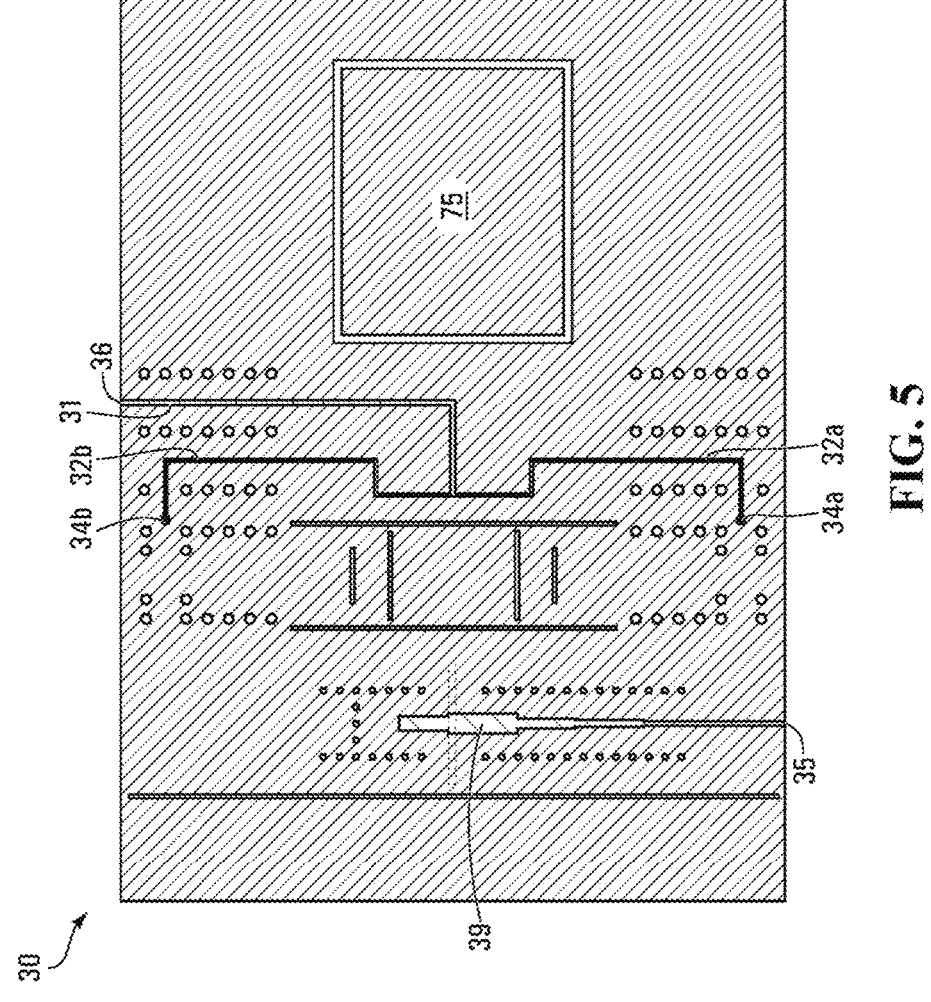
FIG. 5 is a schematic diagram of a top side of a layer implementing striplines and ports, according to an embodiment of the disclosure.
Figure 6:
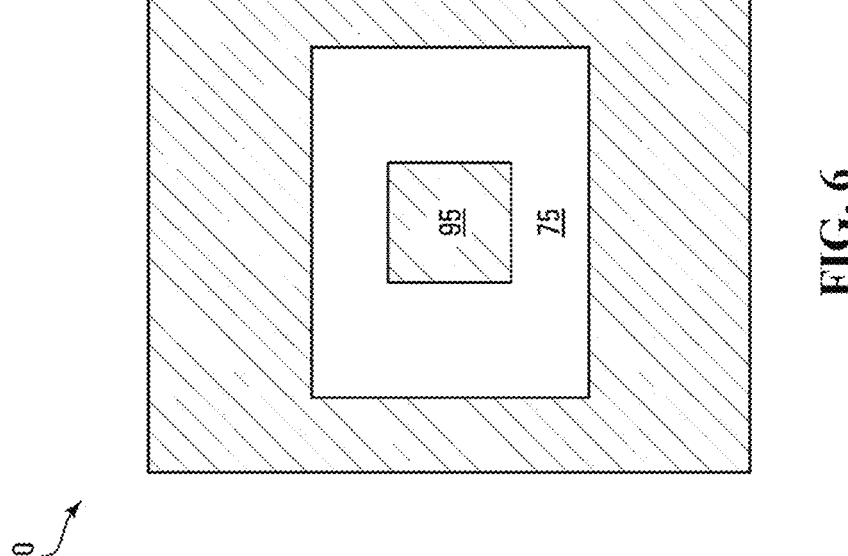
FIG. 6 is a schematic diagram of a layer implementing a patch antenna, according to an embodiment of the disclosure.

As can be seen in FIGS. 2-5, during operation, when transmitter port 36 is excited by a signal, the signal propagates within stripline 31 (see FIG. 5) and is divided along two identical branches 32a and 32b. Stripline 31 and branches 32a and 32b are implemented in layers 30 and 50. Branches 32a and 32b transition into striplines 33a and 33b of layer 10, through a pair of via holes 34a and 34b (FIG. 5). Striplines 33a and 33b feed the junction of circulator 16, the junction comprising a pair of opposed ferrite magnets 37. At the junction, the transmitted signal transitions to waveguide 15 via a stripline-to-coplanar waveguide-to-substrate independent waveguide transition. The two portions of the transmitted signal that arrive at opposite sides of the junction are in-phase with one another. Therefore, only the TE10 mode of waveguide 15 is excited. Due to non-reciprocity of circulator 16, the TE10 mode propagates toward coupler 17, as can be seen in FIG. 2. As can be seen in FIG. 4, coupler 17 comprises a pair of first slots 19a perpendicularly oriented relative to a second slot 19b. At coupler 17, the TE10 mode is coupled to antenna 95 and excites the horizontally-polarized elements of antenna 95. Antenna 95 thereby transmits horizontally-polarized electromagnetic waves. Antenna 95 and cavity 75 are shown in more detail in FIG. 6.

Since the non-reciprocity of circulator 16 may not be perfect, a small portion of the electromagnetic waves may leak from transmitter port 36 toward service port 18. The TE10 mode may therefore terminate into service port 18 through a substrate independent waveguide-to-microstrip transition 21, as can be seen in FIG. 3. It has been noted that the coupling between transmitter port 36 and service port 18 is about 20 dB at a center frequency, this being due (as explained above) to leakage from circulator 16. It should be noted that the leaked signal does not couple to receiver port 35, since the leaked signal is a TE10 mode or a common mode signal, while receiver port 35 may only be excited by a TE20 mode or a differential mode signal. In other words, service port 18 and transmitter port 36 are common mode ports whereas receiver port 35 is a differential mode port. As a result, the isolation between receiver port 35 and transmitter port 36 is inherently very high.

In addition, as can be seen in FIG. 3, a section 23 of relatively narrower waveguide 15 is provided between a main portion of waveguide 15 and microstrip transition 21 to service port 18. Section 23 may increase the isolation between the received signal and service port 18, since section 23 may only propagate the TE10 mode of waveguide 15 and therefore will appear as an open circuit with respect to the TE20 mode of waveguide 15.

Reception

During the reception of signals, the vertically-polarized elements of antenna 95 are excited by incoming electromagnetic waves. This excitation of the vertically-polarized elements of antenna 95 in turn excites the TE20 mode within coupler 17. As can be seen in FIG. 2, the TE20 mode then propagates from coupler 17 toward dual-mode circulator 16. Due to the non-reciprocity of circulator 16, a bulk of the TE20 mode passes through the middle of waveguide 15, between magnets 37, and generally does not couple (or couples weakly) to the side ports of circulator 16. In addition, the TE20 mode cannot couple to narrower section 23 since only the TE10 mode can pass through narrower section 23, as described above. Therefore, the TE20 mode forms a standing wave in front of narrower section 23. As can be seen in FIG. 4, a longitudinal slot or aperture 26 is etched on an upper wall of waveguide 15 and enables the TE20 mode to couple from waveguide 15 in layer 10 to a stripline 39, in layer 30, feeding receiver port 35. Stripline 39 terminates at receiver port 35 whereat the received signal is detected.

A small portion of the TE20 mode of the received signal, as the signal propagates toward circulator 16, may couple into the side ports the junction of circulator 16 due to imperfect non-reciprocity of circulator 16. However, since the phase of the TE20 mode is differential, the TE20 mode is not coupled to the striplines feeding transmitter port 36 in layer 30. Therefore, the signal is reflected back into circulator 16. While the amount of reflection is generally small, it is best avoided. Therefore, each length of branches 32a and 32b of stripline 31 is set to be about $(2n-1)\lambda s/4$, wherein n is an integer number, and $\lambda$ is a length of the branch (in units of wavelength). Because there is a virtual grounding for the TE20 mode at the intersection of branches 32a and 32b of stripline 31, the input impedance at the junction of circulator 16 as seen from the perspective of the TE20 mode would appear as that of an open circuit. Therefore, the TE20 mode does not couple into stripline 31. This may result in a relatively high isolation between the receiving and transmitting channels.

It should also be mentioned that the horizontally-polarized elements of antenna 95 cannot couple to receiver port 35, since these elements of antenna 95 excite the TE10 mode within waveguide 15 and therefore cannot couple to receiver port 35 which is a differential mode port.

Figure 7:
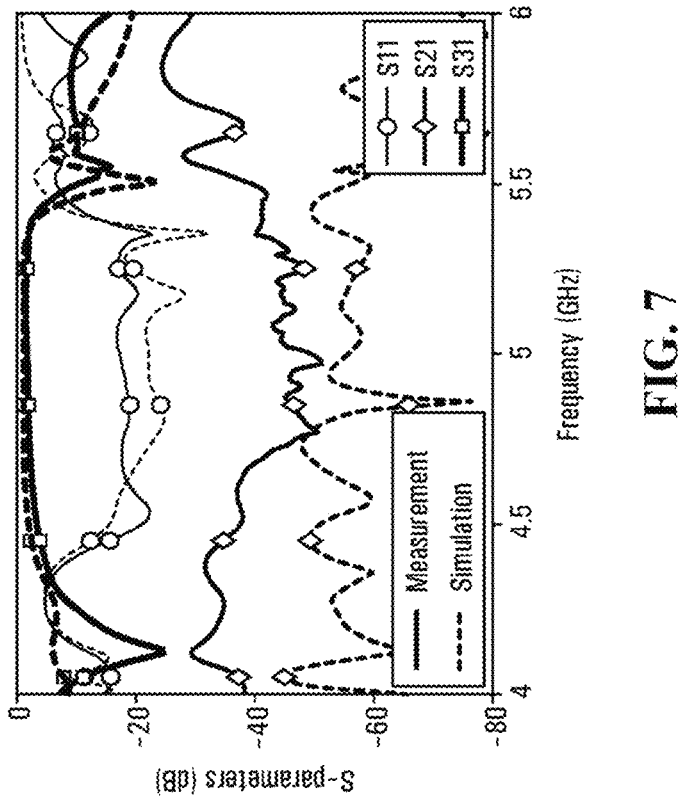
FIGS. 7-11 are plots of S-parameters as a function of operating frequency, according to embodiments of the disclosure.
Figure 8:
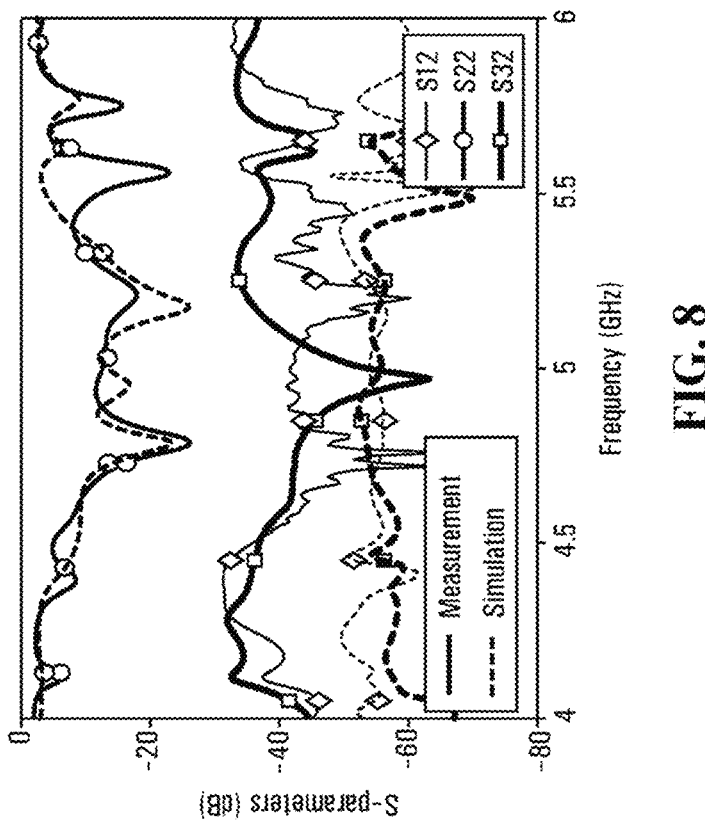
Figure 9:
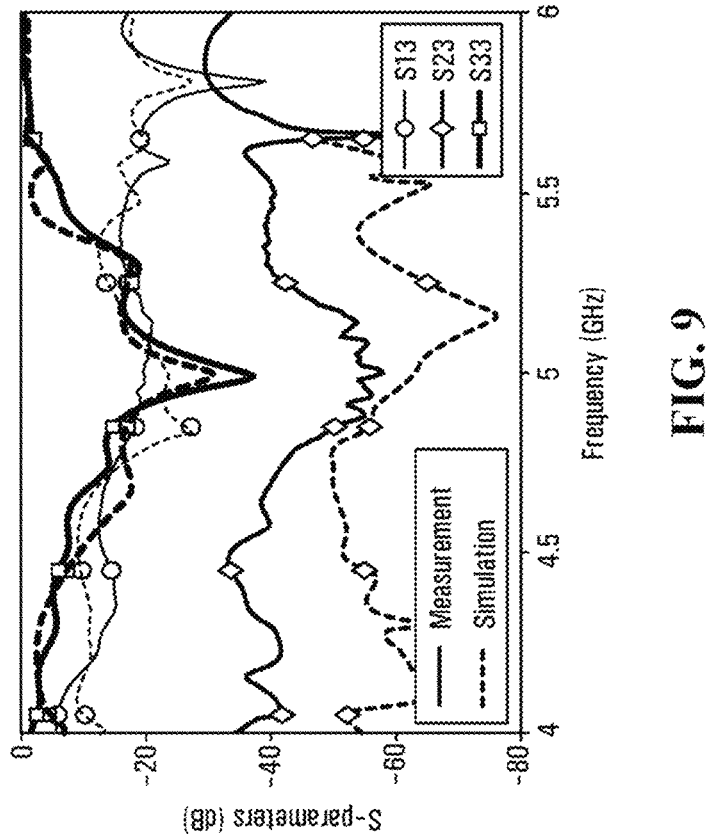

Turning now to FIGS. 7-9, the three port scattering parameters were measured using a Keysight vector network analyzer (VNA), and the results are separately plotted and compared to simulation results for each port excitation. In these plots, "1" refers to service port 18, "2" refers to receiver port 35, and "3" refers to transmitter port 36. In these measurements, a symmetrical magnetic biasing was applied to ferrite magnets 37 at the junction of circulator 16. As can be seen, the results indicate that the impedance bandwidth is about 600 MHz from 4.7 GHZ to 5.3 GHZ. The isolation (the ratio of the magnitude of the transmitted signal to the received signal) is seen to be better than 50 dB (for S23) for more than 330 MHz, which is generally a wide bandwidth for such a degree of isolation. This isolation is relatively large for circuits based on PCB technology.

However, the isolation can be enhanced by applying a slightly asymmetrical and non-homogeneous magnetic bias to ferrite magnets 37. Such asymmetrical magnetic biasing may cause slight mode-conversion in waveguide 15, which can be exploited to tune the depth and center frequency of the isolation. This may allow for a relatively simple and efficient tuning mechanism for the isolation.

Figure 10:
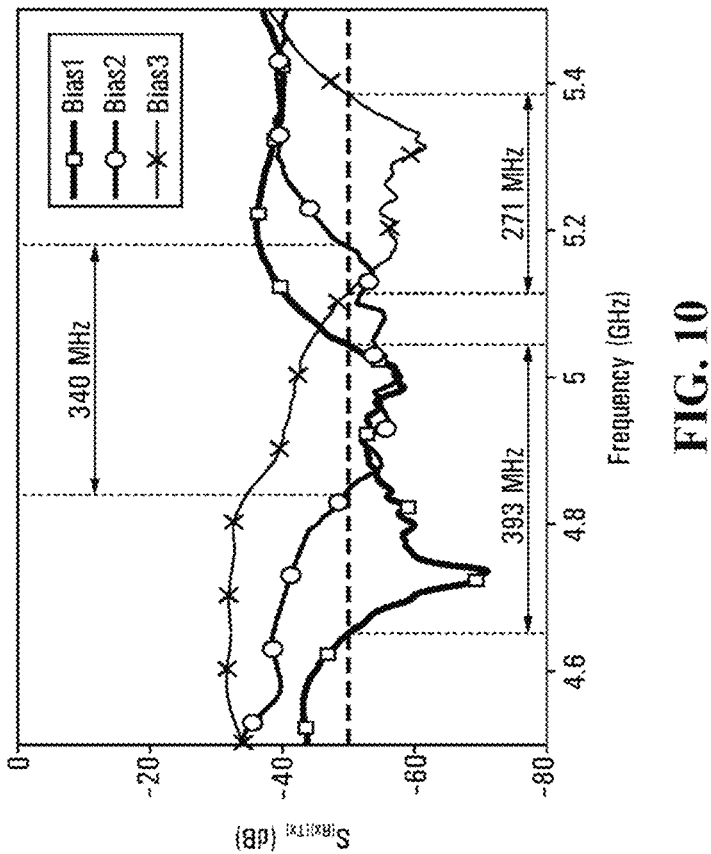
Figure 11:
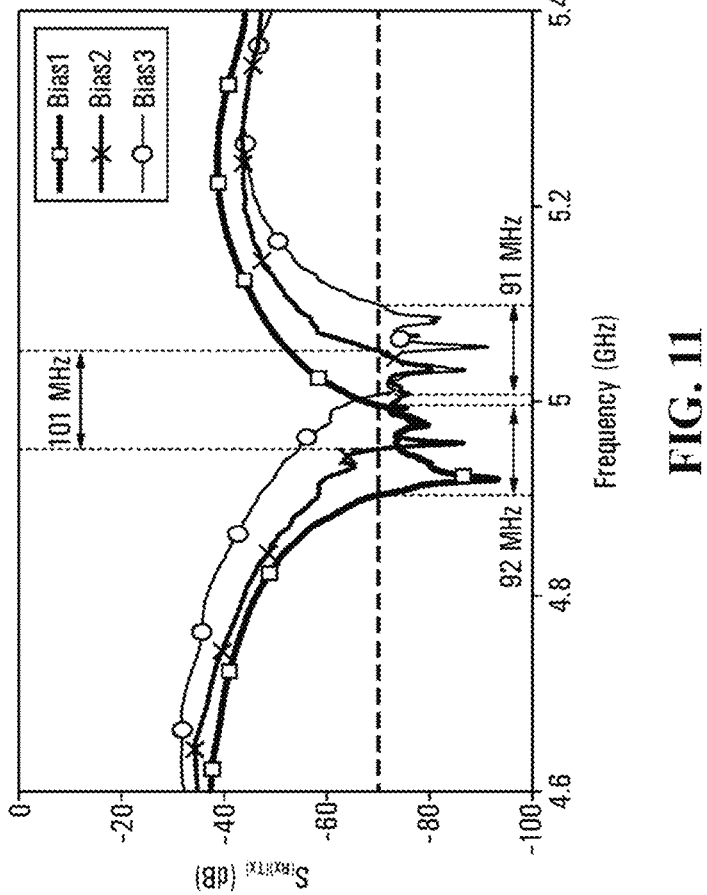

Therefore, and with reference to FIGS. 10 and 11, by applying an asymmetrical magnetic bias to magnets 37, the depth and center frequency of the isolation may be tuned. On the other hand, by applying a symmetrical magnetic bias to magnets 37, the bandwidth over which the isolation occurs may be tuned.

For example, FIG. 10 shows one set of results that yielded isolations better than 50 dB at different center frequencies and over relatively broad bandwidths, using asymmetrical magnetic bias tuning. Similarly, FIG. 11 shows another set of results where isolations better than 70 dB over at least 90 MHz bandwidth and at different center frequencies were achieved. The achieved isolations are relatively high and satisfy the required isolation in the analog domain to enable a full-duplex transceiver for even high-power applications. Furthermore, the achieved bandwidth is sufficient for advanced 6G applications in the sub 6 GHz region.

As can be seen, there has been described a full-duplex transceiver that may have a number of advantages over current-state-of-art techniques. In particular, according to some embodiments, the transceiver may be all-passive (in other words, the transceiver may not include any active circuits for the active cancellation of the self-interference signal), which may enable the manufacture of transceiver to be simpler and lower-cost. In addition, the linearity and noise figure may be superior. Furthermore, by using a passive structure and a waveguide as the main components for wave propagation, the transceiver may be capable of handling relatively high power and is suitable for high-power base station applications. In addition, the DC power consumption may be zero, whereas in the prior art the DC power consumption may be non-zero. For example, full-duplex methodologies based on N-path filters that make use of additional local oscillators increase the DC power consumption. Furthermore, the transceiver described herein is tunable using a small magnetic bias variation, which can control the depth and frequency of the isolation. In addition, the isolation was shown to be better than 70 dB over at least 90 MHz.

Other features of the transceiver may contribute to the relatively high isolation levels. For example, via loadings around the striplines may provide sufficient shielding to avoid inter-substrate couplings. Furthermore, the antenna may be designed to have low cross-polarization, resulting in relatively high inter-port isolation at the antenna interface. Moreover, integrating the antenna and the circulator in a common module may eliminate the intermediate transitions between the antenna and the circulator (which may be a significant source of mode conversion and inter-port coupling due to the introduction of numerous asymmetrical discontinuities), thus enhancing the isolation.

As described above, a cavity-backed patch antenna was used. However, this antenna may be replaced with any other suitable dual-polarized antenna, such as (but not limited to) a slot antenna, a metasurface antenna, a magnetoelectric dipole antenna, or a metallic waveguide antenna. In addition, and without loss of generality, the antenna may comprise an array structure.

Furthermore, other transitions for the circulator may be used, such as microstrip, coplanar waveguide, and slot transitions. In addition, materials other than ferrite may be used for the circulator junction.

Any of the circular and/or rectangular vias seen in the drawings may, according to some embodiments, be removed or modified (such as in their shape or their position), without departing from the scope of the disclosure.

The cavity for the antenna is optional and, according to some embodiments, may be removed.

The T-shaped slot of the coupler on the waveguide, for the dual-polarized excitation of the antenna, may be modified into different shapes. For example, the coupler may comprise a cross-shaped slot or longitudinal and transverse slots.

As described above, the service port is optional. As a result, the narrower section of the waveguide, adjacent the service port, may also be removed. In such a case, the waveguide will terminate at a short-circuit wall, and some modifications to the positions of the matching vias may be required.

The number of layers used for the antenna may be decreased or increased, and/or their respective thicknesses may be changed, to adjust bandwidth of the antenna.

Generally, embodiments of the transceiver described herein are scalable to the whole microwave and millimeter frequency ranges. Furthermore, embodiments of the transceiver may be used in conjunction with other existing full-duplex solutions, such as multiple-in and multiple out (MIMO) systems, radar systems, and conventional half-duplex systems. For example, it may be possible to implement the transceiver jointly with a radar system.

The transceiver may be used in an apparatus such as a base station or a terminal device in a cellular communication system, or in an apparatus in another communication system.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, as used herein, the terms coupled, coupling, or connected can indicate that two elements or devices are directly connected to one another or connected to one another through one or more intermediate elements or devices via a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

While the disclosure has been described in connection with specific embodiments, it is to be understood that the disclosure is not limited to these embodiments, and that alterations, modifications, and variations of these embodiments may be carried out by the skilled person without departing from the scope of the disclosure.

It is furthermore contemplated that any part of any aspect or embodiment discussed in this specification can be implemented or combined with any part of any other aspect or embodiment discussed in this specification.

The invention claimed is:

1. A full-duplex transceiver comprising:
a dual-polarized antenna, a dual-mode waveguide circulator, and at least a receiver port and a transmitter port, wherein:
the dual-polarized antenna is configured to:
transmit first electromagnetic waves polarized by the dual-polarized antenna according to a first polarization; and
receive second electromagnetic waves polarized according to a second polarization orthogonal to the first polarization; and
the dual-mode waveguide circulator is configured to:
in response to electromagnetic waves being received at the transmitter port, guide a TE10 mode of the electromagnetic waves to the antenna for coupling the TE10 mode of the electromagnetic waves to the antenna and polarizing the electromagnetic waves according to the first polarization to form the first electromagnetic waves; and in response to the second electromagnetic waves being received at the antenna, couple a TE20 mode of the second electromagnetic waves to the waveguide circulator and guide the TE20 mode of the second electromagnetic waves to the receiver port.

2. The transceiver of claim 1, wherein:

the waveguide circulator further comprises a coupler for:

coupling, to the antenna, the TE10 mode of the electromagnetic waves received at the transmitter port; and coupling, to the waveguide circulator, the TE20 mode of the second electromagnetic waves received at the antenna; and the coupler comprises at least one first slot oriented perpendicularly to at least one second slot.

3. The transceiver of claim 1, wherein:

the transmitter port is a common mode port configured to couple to the TE10 mode of the electromagnetic waves received at the transmitter port but not couple to the TE20 mode of the second electromagnetic waves received at the antenna; and the receiver port is a differential mode port configured to couple to the TE20 mode of the second electromagnetic waves received at the antenna but not couple to the TE10 mode of the electromagnetic waves received at the transmitter port.

4. The transceiver of claim 1, wherein the receiver port and the transmitter port are not comprised in the waveguide circulator.

5. The transceiver of claim 1, further comprising a service port configured to couple to the TE10 mode of the electromagnetic waves received at the transmitter port.

6. The transceiver of claim 5, wherein the waveguide circulator comprises the service port.

7. The transceiver of claim 5, further comprising circuitry configured to:

receive, from the service port, the TE10 mode of the electromagnetic waves received at the transmitter port;

generate, based on the received TE10 mode of the electromagnetic waves, a replica signal; and use the replica signal to reduce interference between the TE10 mode of the electromagnetic waves received at the transmitter port and the TE20 mode of the second electromagnetic waves received at the antenna.

8. The transceiver of claim 5, wherein, so as to prevent the TE20 mode of the second electromagnetic waves received at the antenna from coupling to the service port, a width of the waveguide circulator at a first location is less than a width of the waveguide circulator at a second location, wherein the first location is closer to the service port than the second location.

9. The transceiver of claim 1, wherein:

the waveguide circulator comprises a non-reciprocal junction having spaced-apart and opposed sides; and the transceiver further comprises a bisected stripline connecting the transmitter port to the opposed sides of the non-reciprocal junction.

10. The transceiver of claim 9, further comprising an intermediate coplanar waveguide transition for transferring the TE10 mode of the electromagnetic waves received at the transmitter port from the bisected stripline to the waveguide circulator.

11. The transceiver of claim 1, wherein:

the waveguide circulator further comprises a non-reciprocal junction having a pair of magnetic components; and the transceiver further comprises circuitry for one or more of:

symmetrically tuning the pair of magnetic components so as to tune an operating frequency of the transceiver; and asymmetrically tuning the pair of magnetic components so as to tune an isolation frequency of the transceiver.

12. The transceiver of claim 1, wherein:

the transceiver further comprises a stripline connected to the receiver port; and the waveguide circulator further comprises an aperture configured to couple the TE20 mode of the second electromagnetic waves received at the antenna to the stripline connected to the receiver port.

13. The transceiver of claim 1, wherein:

the transceiver further comprises one or more striplines;

each stripline comprises one or more interconnected sections; and each section has a length of $(2n-1)\lambda/4$, wherein n is an integer and $\lambda$ is a wavelength of a transverse electric mode of electromagnetic waves carried by the one or more striplines.

14. The transceiver of claim 1, wherein one or more of the first electromagnetic waves and the second electromagnetic waves have a wavelength of from 56.50 mm to 63.79 mm in air.

15. The transceiver of claim 1, wherein the waveguide circulator is configured such that a degree of isolation between the TE10 mode of the electromagnetic waves received at the transmitter port and the TE20 mode of the second electromagnetic waves received at the antenna, when the TE10 mode and the TE20 mode are guided by the waveguide circulator, is greater than 70 dB over at least a 90 MHz bandwidth.

16. A method of transmitting and receiving signals using a transceiver, comprising:

receiving electromagnetic waves at a transmitter port;

in response to the electromagnetic waves being received at the transmitter port, using a dual-mode waveguide circulator to guide a TE10 mode of the electromagnetic waves to a dual-polarized antenna and couple the TE10 mode of the electromagnetic waves to the antenna;

in response to the TE10 mode of the electromagnetic waves being coupled to the antenna, transmitting, by the antenna, first electromagnetic waves polarized by the dual-polarized antenna according to a first polarization;

receiving, at the antenna, second electromagnetic waves polarized according to a second polarization orthogonal to the first polarization; and in response to the second electromagnetic waves being received at the antenna, using the waveguide circulator to couple a TE20 mode of the second electromagnetic waves and guide the TE20 mode of the second electromagnetic waves to a receiver port.

17. The method of claim 16, further comprising one or more of:

symmetrically tuning a pair of magnetic components of the waveguide circulator, so as to tune an operating frequency of the transceiver; and asymmetrically tuning the pair of magnetic components so as to tune an isolation frequency of the transceiver.

18. The method of claim 16, wherein a degree of isolation between the TE10 mode of the electromagnetic waves received at the transmitter port and the TE20 mode of the second electromagnetic waves received at the antenna is greater than 70 dB over at least a 90 MHz bandwidth.

19. The method of claim 16, wherein one or more of the first electromagnetic waves and the second electromagnetic waves have a wavelength of from 56.50 mm to 63.79 mm in air.

20. The method of claim 16, further comprising further comprising coupling, to a service port, the TE10 mode of the electromagnetic waves received at the transmitter port.

\* \* \* \* \*